H. W. ADAMS.
Furnace and Apparatus for Smelting Ores and Condensing Fumes.

No. 227,710.  Patented May 18, 1880.

H. W. ADAMS.
Furnace and Apparatus for Smelting Ores and Condensing Fumes.

No. 227,710.  Patented May 18, 1880.

H. W. ADAMS.
Furnace and Apparatus for Smelting Ores and Condensing Fumes.

No. 227,710. Patented May 18, 1880.

Witnesses.
John H. Burroughs
Charles Boland

Inventor
Henry W. Adams

UNITED STATES PATENT OFFICE.

HENRY W. ADAMS, OF NEW YORK, N. Y.

FURNACE AND APPARATUS FOR SMELTING ORES AND CONDENSING FUMES.

SPECIFICATION forming part of Letters Patent No. 227,710, dated May 18, 1880.

Application filed January 27, 1880.

*To all whom it may concern:*

Be it known that I, HENRY W. ADAMS, a citizen of the United States, residing in the city, county, and State of New York, have invented a new, useful, and Improved Furnace and Apparatus for Smelting Metallic Ores and Saving their Products; and I do hereby declare that the following is a full, clear, and exact description of the invention, which will enable others skilled in the art to which it appertains to make and use the same.

My invention relates to improvements in blast-furnaces and apparatus for smelting metallic ores and saving their products; and the objects of my improvements are to produce a better hot-blast and more intense heat, in order to melt the ores into a thinner and more limpid slag, so that all the metal contained in it may easily settle from it and be saved; to inclose underneath the bottom of my furnace a cast-iron pot to be lined with any infusible substance and protected by fire-bricks from a melting heat, so as to prevent the leakage and loss of the fused metal in the base of the furnace; to keep this pot sufficiently hot by a special fire underneath it to prevent the melted metal from chilling in the same; to provide a bench of retorts to be heated by the hot gases which escape from the furnace for the manufacture of chlorine gas or muriatic-acid gas for use in the treatment of non-smelting ores; to provide a condenser for condensing all the metallic vapors and fumes which escape from the furnace, and saving the same; to manufacture chlorine water and muriatic acid; to manufacture sulphuric acid from the sulphurous-acid gas which escapes from the furnace, for use in decomposing the chloride of sodium charged into the before-mentioned retorts for the generation of muriatic-acid gas or of chlorine gas when the said retorts are charged with a proper percentage of the oxide of manganese in conjunction with common salt.

I attain these objects by the mechanism illustrated in the accompanying drawings, in which—

Similar letters refer to similar parts throughout the several views.

A represents the platform on which the furnace and apparatus are erected. B is the lower furnace-door; C, the fire-place; D, the grate-bars; E, the ash-pit; F, the flue, and G the uptake. This furnace is constructed in the platform A, and extends underneath and across the diameter of the base of the smelting-furnace. It should be sixteen inches wide and eighteen inches from the grate-bars to the crown of the arch. The ash-pit should be sixteen inches wide and two feet deep and two-thirds of the diameter of the smelting-furnace in length. These proportions are best for the proper effect of the hot-air blast, which is introduced both into the ash-pit and over the furnace-fire, for the purpose of keeping the base of the smelting-furnace above it sufficiently hot to prevent either the melted metal or slag from chilling in the lower end of the said furnace and destroying its usefulness.

H is the door of the smelting-furnace; I, the fire-place; J, the grate-bars; K, the ash-pit. This fire-place is twelve inches wide and sixteen inches high from the top of the grate-bars to the crown of the arch, and four feet long from its front end to its opening into the furnace. The grate-bars are three feet long, and the distance from the front side of the bridge-wall to the interior of the furnace is twelve inches. The bridge-wall is four inches high above the grate-bars. These are the most suitable proportions to create the proper heat needed by means of the hot-blast produced by the heated air injected over the burning fuel and into the ash-pit of the furnace. The ash-pit is three feet long, one foot wide, and eighteen inches deep.

I have shown only one furnace. Any desired number may be employed. I usually use four, placed equally distant and on a level with each other. Any number of tuyeres may be employed underneath and between the mouths of these fire-places, which open into the furnace, to inject jets of air under pressure into the furnace, to aid the fusion of the charge, as is customary in iron blast-furnaces. Eight of these is a good number, having nozzles about one inch in diameter.

L is the outer circular wall of the smelting-furnace. It is thirteen inches thick, and constructed of common bricks laid with good mortar. It is about eleven feet in external diameter from its bottom to its top. It is about twenty-five feet high from the platform to the feeding-door.

M is a platform about sixteen feet long and six feet wide, on which the ore to be fed into the furnace is dumped. The furnace is supposed to be built on the side of a mountain, so that a cartway on a level with this platform may be made on the ground sufficiently broad to enable carts to come and go and dump their charges without inconvenience.

N is an arched flue over the top of the furnace for conducting the gases, as hereinafter described. The walled arch and its two ends are constructed of bricks laid in good mortar, and are all about two feet thick, so as to be gas-tight. The inside capacity of this flue should be at least five feet wide and eighteen inches high.

O is the feeding-door, which is about eighteen inches long and one foot wide. This door opens a passage, through which the ore is pushed into the furnace.

P is a tap-hole for drawing off the melted metal from the bottom of the smelting-furnace.

Q is another tap-hole, a little higher up, for drawing off the fluid slag. The tap-hole P should be inserted into the crucible close to the bottom, so as to draw the metal out clean. The tap-hole Q should be inserted into the crucible about eighteen inches above its bottom. The former should be at least two inches in diameter and the latter six inches. These two tap-holes should always be made into the crucible, for special uses for drawing off clean both the metal and slag when required, even though other similar tap-holes should be made and fitted with overflow-pipes having their discharging ends so elevated as to run off the metal and slag continuously.

R is the blast-pipe, which conducts the hot air under pressure over the furnace-fire.

S is a stop-cock for regulating the blast.

T is the inside wall of the furnace. It is constructed of good fire-bricks laid in fire-clay mortar. It is thirteen inches thick and as high as the outside wall. It is circular, like the outside wall, and five feet in internal diameter at its top. This internal diameter of five feet extends downward for a distance of twelve feet, and forms the cone of the furnace. From this point the boshes commence and extend down five feet, gradually narrowing to a diameter of three feet. Below this point is the breast of the furnace, three feet deep and three feet wide. Below this again is the crucible, which is four feet deep, three feet in internal diameter at its top, and narrowing gradually to one foot in internal diameter at its bottom.

U is this cast-iron vessel. It has a thickness of about two inches, and internal dimensions, when the lining is put into it, as aforesaid. This rests on a floor of fire-bricks about five inches thick. This floor is represented by V. It forms the top of the fire-place beneath it, so that the heat from the furnace below may heat it red-hot, and consequently heat the iron pot sufficiently hot to prevent the liquid metal and slag contained in it from chilling. It is otherwise bricked in, so as to prevent it from melting.

W is a lining about one inch thick, composed of plumbago, alumina, or a casing composed of the infusible carbon deposited on the inside of coal-gas retorts. These materials, or any of them, or any other suitable material, may be pulverized and mixed with molasses or any other suitable adhesive substance into a very stiff dough, and pressed into its place with proper machinery and suitable mechanical power. The iron pot is designed to prevent any leakage of fluid metal or slag through the base of the furnace, and the lining is designed to protect it from too great heat and prevent any adhesion of fused matter to it. This iron pot is also intended to conduct more readily than bricks or tiles could the heat from the furnace underneath it up around the sides and near the top of the receptacle of the metal and slag, for the purposes already explained. The tap-holes are cast in this pot, as shown in the detailed view of Fig. 4.

I prefer for general use the construction of the furnace as here shown in detail. Its fire-place is inclined downward at quite an angle. This is for two reasons—first, to prevent the ore from falling into the fire-place, and, secondly, to prevent the fluid slag from readily overflowing the bridge-wall.

X and Y are pans in the two ash-pits, for holding water to be evaporated by the heat deflected from the fires above them and supply aqueous vapor to cool the grate-bars, and pass into the burning fuel to be decomposed into oxygen and hydrogen gases for the production of more intense and abundant combustion.

Figures 7, 8, 9, 10:
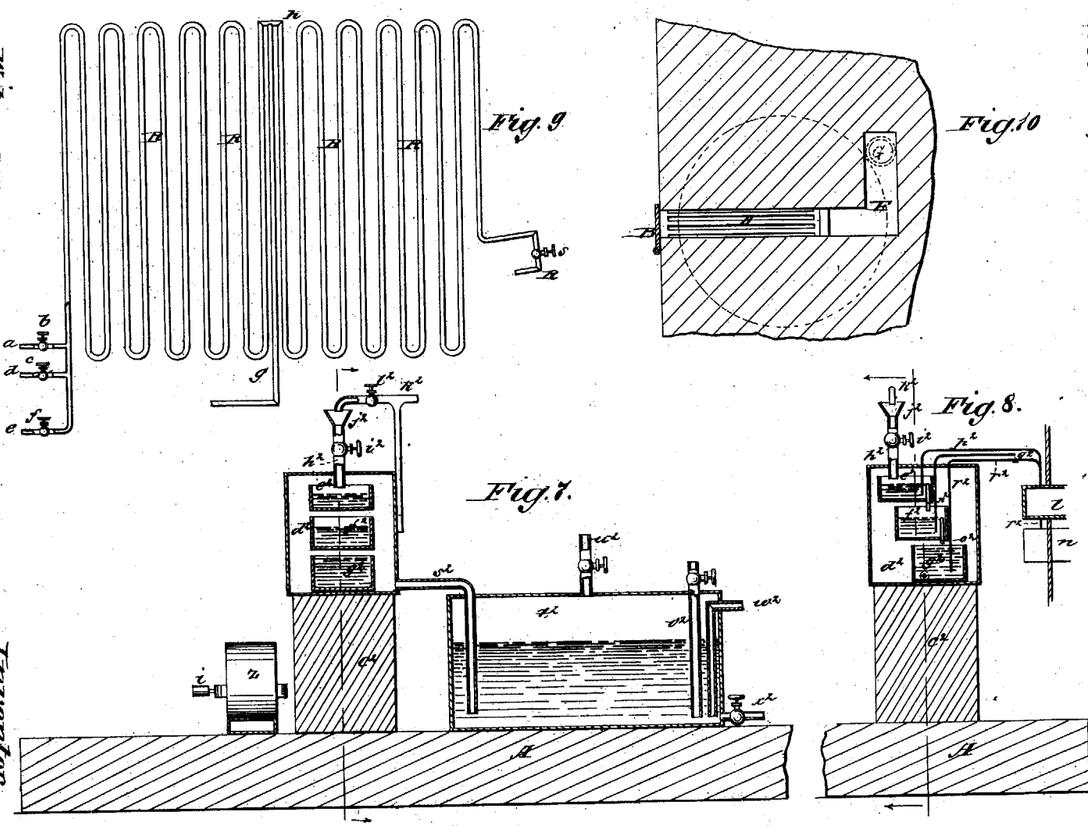
Fig. 7, a longitudinal section of the machine for saturating water with chlorine gas or muriatic-acid gas and a tank for receiving and storing the same.
Fig. 8, a cross-section of the machine for saturating water with chlorine gas or with muriatic-acid gas when either the one or the other is generated in the before-mentioned retorts.
Fig. 9 is a detailed vertical section of a series of iron pipes arranged in a circular form between the outer and inner walls of the furnace, where they are highly heated, and through which atmospheric air is forced by a blower or other power, to escape into the ash-pits and over the furnace-fires of the furnace.
Fig. 10, a detailed section of the lower furnace and its flue.

The annular space B' between the outer and inner circular walls, L T, of the smelting-furnace is one foot wide. This space is provided for two purposes—first, that it may be filled with sand, ground slag, or other suitable substance packed tightly to prevent the escape of noxious gases through the cracks or joints of the inner wall, and, secondly, for the introduction of iron pipes, to be highly heated, through which atmospheric air may be forced by suitable machinery, to be introduced as a hot-blast into the ash-pits and over the burning fuel of the furnace. These pipes are shown in Fig. 9. They are three inches in diameter, more or less.

R is the end of the pipe, which enters the combustion-chamber of the upper fire-place just over the furnace-door, and delivers a blast of hot air into the said chamber. This blast produces a blow-pipe heat and forces the white-hot products of combustion into contact with the red-hot and roasted ore in the smelting-furnace. S is the stop-cock for regulating the force of the blast. This pipe passes up and down from the bottom to the top of the aforesaid annular space, each bend being about a foot apart, until the circle is completed, and the opposite end comes down near to the two fire-places and ash-pits, from whence it starts. $a$ represents a branch from this pipe, which enters the side of the upper ash-pit for supplying it with hot air under pressure, to be forced up through the grate-bars and through the burning fuel to intensify the combustion. $b$ is a stop-cock for regulating this blast. $c$ is another branch pipe, entering the combustion-chamber of the lower fire-place immediately over the furnace-door, to deliver a blast of hot air into it for the purposes already mentioned. $d$ is the stop-cock to control this blast. $e$ is the final end of the first-named pipe, and enters the ash-pit of the lower fire-place to inject a blast of heated air for purposes similar to those described. $f$ is the stop-cock to regulate the same. To force atmospheric air through this bent pipe, and to cause it to be discharged at the same time at both ends of the same, the pipe $g$ is extended up to the T $h$ and screwed into the said T. The blower Z is then attached to the pipe $g$.

A belt is attached to the pulley $i$, and made, by means of any suitable power, to revolve rapidly the winged shaft of the blower Z, which forces air into the pipe $g$ and up into the T $h$, from whence it goes both ways and supplies the respective blast-nozzles.

This arrangement for heating the air to a very high temperature by means of the waste heat of my smelting-furnace I consider to be very simple, economical, and effectual.

The force of the blast should be equal to from five to ten pounds per square inch. The latter pressure is necessary in all regions of high elevation, where the air is too rare to produce intense combustion without considerable compression. In such cases a cylinder-blower fitted with a piston and driven by an engine must be used.

I build the inner circular wall of my smelting-furnace first. I then set up the air-blast pipes around it to within one foot of the top of the said wall, and at such a distance from it that the centers of all the said pipes shall be six inches from the outside surface of the wall. I then commence to build the outer circular wall, leaving a space one foot wide between the two walls. After building it up one or two feet high, I then fill up this empty space with sand or ground slag or other suitable pulverulent matter, and ram it down tightly. This leaves the iron air-pipes in the center of the space between the two walls surrounded firmly by the said packing. I then build up another section, and fill it up as before, until the outer wall is carried up to the same height of the inner one. I then fill in the empty space between the two walls and above the tops of the pipes with solid brick-work, which is represented by the letter $j$.

$k$ is a bench of three retorts, $l$ $m$ $n$, each about two feet wide, thirty inches high, and seven feet long. Both ends project through the sides of the bench. The front ends are provided with doors and fastenings similar to coal-gas retorts. The front end of each retort is furnished with an inlet-pipe, $o$ $o$ $o$, and a stop-cock, $p$ $p$ $p$, and a funnel, $q$ $q$ $q$, for the introduction of sulphuric acid. They should be made of stout lead or clay. The retorts should be made of well-burned fire-clay and provided with earthen or iron retorts, fitting loosely inside, to be replaced when injured by sulphuric acid, chlorine gas, or muriatic-acid gas. They are to be used as hereinafter described. They are set in this place, so as to be heated by the hot gases escaping from the blast-furnace without the expense of a separate fire.

The bench $k$ and the water-tank $z$ rest on the foundation $s$ and piers $r$. This foundation is about forty feet long and five feet four inches high. It consists, in the first place, of two brick walls eighteen inches thick and having the aforesaid length and height, standing directly opposite to each other and six feet apart. The rear wall has no openings through it. The front wall has eight openings, which are closed by the doors $t$ $t$ $t$ $t$ $t$ $t$ $t$ $t$.

The letter $u$ is a pier built of brick, two feet wide and twelve feet high, between the two outside walls and in close contact with them, and rising six feet eight inches above them. An empty space about seven inches wide is left through the center of the upper six feet, eight inches of this partition to be filled with sand or ground slag or other suitable material, and packed tightly to prevent the escape of any noxious gases through any cracks or joints which the heat might make in this wall. The side walls are carried up eighteen inches thick above the foundation $s$, to the height of eight feet and eight inches. These two side walls make the front and rear sides of the bench $k$, and extend to the outer furnace-wall, L. When these two outside walls are built the partition v is built up with them to the same height. An arched opening is left in the lower end for the gases coming from the furnace to pass through into the bench k, under the retorts l m n, and heating them on their way to the exit-flue. This partition causes the gases in the furnace to descend under the retorts for the purposes aforesaid. The thickness of this partition is about thirteen inches, and the top of it is distant from the outside wall of the furnace two feet and eight inches, leaving that width of space for the flue.

w is an arched covering ten feet long, three feet thick, and nine feet wide. On this arch rests the arch x, which is three feet thick and nine feet wide, resting by its other end on the top of the two opposite walls of the smelting-furnace. Two side walls, y y, are now built up underneath this arch, and rest on the top of the furnace and on the tops of the two side walls of the bench k, so as to close up the flue N.

The letter z is a water-tank twenty feet long, five feet deep, and nine feet wide. It is made of thick plank and lined with sheet-lead. It is designed to hold water for cooling the hot gases and metallic fumes generated in the smelting-furnace and passing from it through the flue N, and through the bench k, and through the flue $a'$.

The letter $b'$ is a pipe for delivering cold water into the bottom of this water-tank at the end farthest removed from the furnace. $c'$ is an overflow-pipe, placed in the opposite end of the tank and near its top. These pipes should be from two to three inches in diameter. The object of these pipes is to deliver cold water into the first-named end of the tank, and to discharge the hot water from its opposite end, for the purposes aforesaid.

Figure 1:
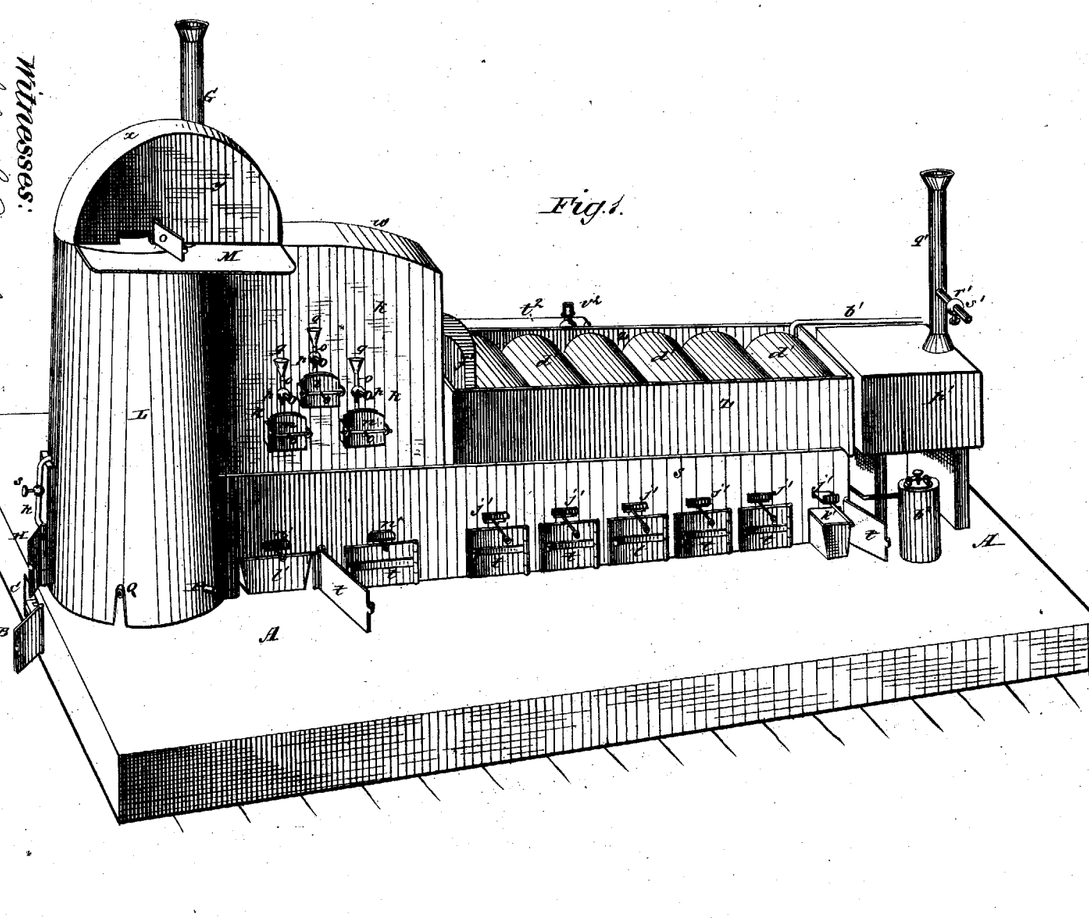
Figure 1 is a front perspective of the entire machine.
Figures 3, 4, 5, 6:
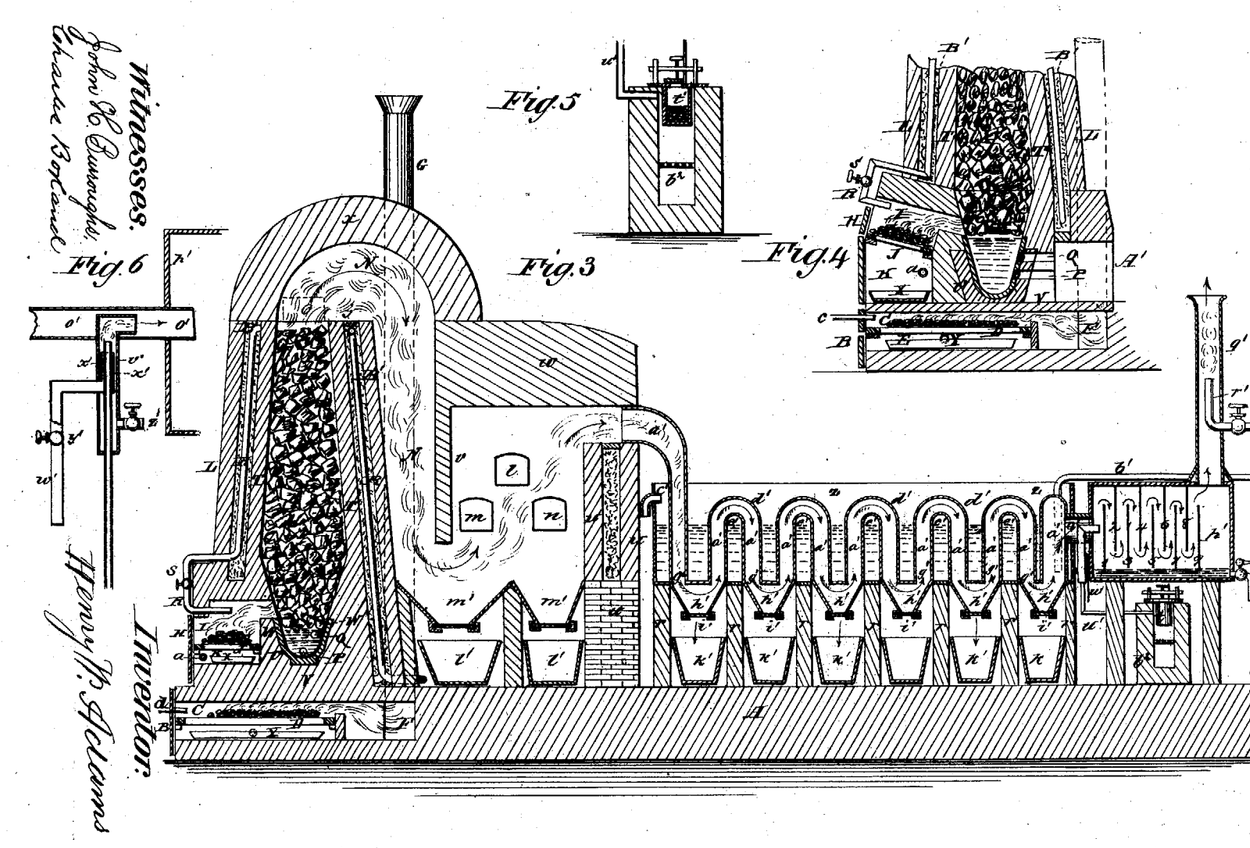
Fig. 3, a longitudinal section.
Fig. 4, a detailed view of the bottom of the furnace in a vertical section.
Fig. 5, a detailed sectional view of a furnace for distilling nitrate of soda.
Fig. 6, a detailed sectional view of the pipes which discharge together into the sulphuric-acid chamber sulphurous-acid gas, which comes from the furnace charged with metallic sulphides, nitric acid, which comes from the nitrate-of-soda furnace, steam from a steam-boiler, and atmospheric air, which four elements are necessary to produce sulphuric acid.

The flue extending from the bench k and running into and through the water-tank is made as follows: The material employed is sheet-lead, from one-quarter to one-half of an inch thick, and five feet wide. The exterior portion or covering of the flue is shown by $d'$. The lower side of the flue is shown by $e'$. The distance between the upper and lower sides of the flue is one foot. Its mouth widens to two feet at its point of junction with the brick flue opening from the bench k. The two opposite sides of this flue are represented by $f'$. The bottom ends of both the upper and under sides of the flue are soldered fast to the bottom of the water-tank. Spaces are cut through the bottom of the water-tank, one foot wide and five feet long, (shown by the letter $g'$,) which spaces are continuations of the flue below the bottom of the tank, as shown by the arrows in Fig. 3. The distance from the bottom of the water-tank to the top side of the flue is four feet. When the tank is filled with water this condenser is entirely submerged. The water circulates between the sides of the water-tank and the ends of the condenser, and between the two outer sides of the under part of the flue, and between the two outer sides of the upper part of the flue. This arrangement produces a most effectual condenser. The spaces or continuations of the flue cut through the bottom of the water-tank are united in pairs by the funnel-shaped boxes $h'$, as shown in Fig. 3. These, too, are made of heavy sheet-lead and soldered fast to the bottom of the tank. They are five feet long and extend two feet below the bottom of the tank. They are provided with ends soldered fast to the two sides of each box, so as to make a continuous flue, as shown by the arrows aforesaid. These funnel-shaped boxes are designed to receive the condensed metallic vapors and fumes, which are carried over from the smelting-furnace and borne along through the flue by the gases passing along to the chimney. The opening made in the lower end of these boxes by the two approaching sides of each is eight inches wide and five feet long. Each of these openings is closed by a sliding door, $i'$, which is made to move easily forward and backward in grooves made in the sides of each box near their lower extremity. A slot corresponding in width and thickness to these sliding doors is cut through the side of the wall s directly opposite to and parallel with the grooves in the boxes, so that these sliding doors may project through these slots far enough to be taken hold of by the hand, and be drawn out and shoved back again by a workman on the outside. The ends of these sliding doors are seen in Fig. 1 projecting through the wall s, as indicated by the letter $j'$.

Figure 2:
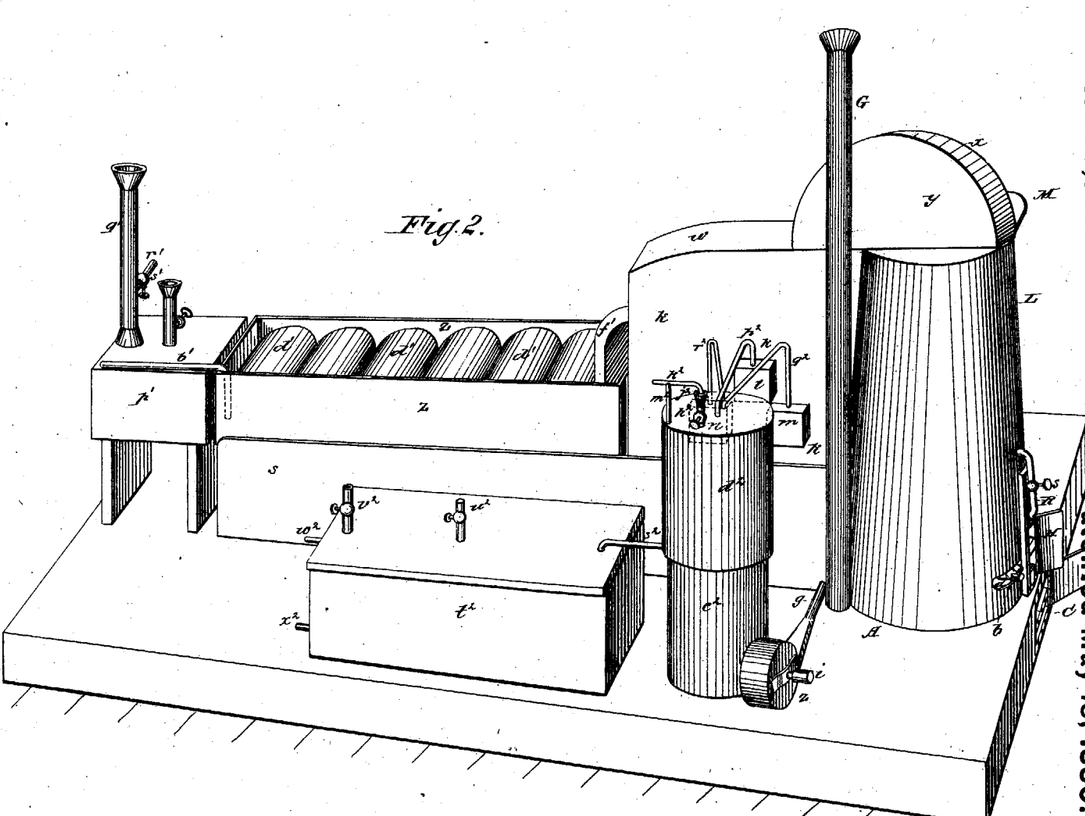
Fig. 2, a rear perspective of the machine.

The letter r represents piers built of brick, on which the bottom of the water-tank z rests. These piers are thirteen inches wide, six feet long, and five feet four inches high. The wall s is built up to the bottom of the water-tank and fitted snugly to the ends of the aforesaid piers. A similar wall is built on the opposite side, as shown in Fig. 2. This arrangement divides the space under the water-tank r into six equal chambers. The doors t t t t t t open into these separate chambers. These doors are two feet eight inches long and two feet wide. They cover openings through the wall s, which are a little smaller than the doors. In each of the aforesaid chambers is placed an iron tray two feet deep, five feet long, and two feet four inches wide across the top. These trays are designed to receive the condensed metallic fumes and matters which collect in the several boxes above them and fall into them when the sliding doors $j'$ are withdrawn. These trays are indicated by $k'$. It will be seen from this arrangement that when the furnace is in operation and the sliding doors $j'$ are shut, and the doors t t t t t t are closed and luted with clay, the whole apparatus is gas-tight. Two similar trays, $l' l'$, are placed in the bottom of the bench k and underneath the funnel-shaped boxes $m' m'$, which are provided with sliding doors, in the manner before described. Their outside projecting ends are indicated by $n'\, n'$. Their object and use are similar to those already described.

I have now traced a continuous flue from the roasting ore through N to the pipe $o'$, which passes through the extreme end of the water-tank $z$ and enters the sulphuric-acid chamber $p'$, which should be twenty feet long, ten feet wide, and ten feet deep. This chamber is to be lined with heavy sheet-lead. It should be half an inch thick and all the joints thoroughly united with pure lead. On the top of this chamber, and at its extreme end, is placed the uptake $q'$. This is the termination of the flue between the roasting ore and the outside air. This chimney should be about eighteen inches in diameter and ten feet high. $r'$ is a steam-pipe, which enters it and turns its open end upward perpendicularly. $s'$ is a stop-cock for regulating the amount of steam allowed to escape from the pipe $r'$ and produce an upward draft through the uptake $q'$.

The uncondensed gases which escape from the blast-furnace, and the roasting ores in which enter this sulphuric-acid chamber, will be very largely composed of sulphurous-acid gas, generated from the burning sulphur in the roasting ore. My object is now to convert this sulphurous-acid gas into sulphuric acid, to be used chiefly in the decomposition of the chloride of sodium in the retorts which are set in the bench $k$. In these retorts I manufacture either chlorine gas from chloride of sodium, the oxide of manganese, and sulphuric acid, to be employed as a solvent of gold in the non-smelting ores; or I manufacture muriatic-acid gas from chloride of sodium and sulphuric acid, to be used in some of the metallurgical steps which I take in the treatment of some ores, and which are not necessary here to describe; but in both cases I need a large amount of sulphuric acid. This I propose to make as follows:

It is necessary to mingle together four elements in order to produce sulphuric acid: sulphurous-acid gas, nitric-acid gas, aqueous vapor, and atmospheric air. This I do in the sulphuric-acid chamber $p'$ in the following manner: The sulphurous-acid gas is delivered into the chamber through the pipe $o'$ from the roasting ores in the smelting-furnace, as aforesaid. The nitric-acid vapor is delivered from the retort $t'$ through the pipe $w'$ into the pipe $v'$, and near its elbow, which is inserted into the pipe $o'$, and which opens toward the sulphuric-acid chamber $p'$. The end of $v'$, through which the pipe $w'$ is inserted, is made gas-tight around the pipe $w'$, leaving a chamber between the inserted end of $w'$ and the inside of the larger pipe $v'$, as in the detailed view shown by Fig. 6.

$w'$ is a steam-pipe, which passes through the pipe $v'$, and through another pipe, $x'$, which surrounds the pipe $w'$, and which is made steam-tight with it in such a manner as to leave a small annular chamber between $w'$ and $x'$, into which the inserted end of the steam-pipe $w'$ enters. $y'$ is a stop-cock on the steam-pipe $w'$.

The letter $z'$ is an air-pipe inserted into the pipe $v'$, and provided with a stop-cock. By opening the stop-cock in $z'$ and opening the stop-cock in $y'$, steam passes through the pipe $w'$ into the annular chamber between $w'$ and $x'$, and, escaping in an annular and expanding jet, impinges against the inside of the pipe $v'$, and makes a partial vacuum behind it in the chamber between $v'$ and $x'$ and $v'$ and $w'$, which draws in atmospheric air through the pipe $z'$, which mixes in the elbow of $v'$ with the steam and the nitric-acid vapor discharged from $w'$, from whence these three elements pass into $o'$, and mix with the sulphurous-acid gas which comes from the roasting sulphides, and enter the chamber $p'$ together.

The nitric-acid vapor furnishes oxygen to oxidize the sulphurous-acid gas, and the oxygen of the air restores to the nitric oxide the equivalent of oxygen which it carries to the sulphurous-acid gas, and the aqueous vapor furnishes the needed humidity to dissolve the crystalline atoms of sulphuric acid thus manufactured, and liquefies it, and causes it to trickle down in a diluted fluid state to the floor of the chamber $p'$, from whence it may be drawn off through the pipe $a^2$.

The letter $b^2$ is a furnace provided with an iron retort, $t'$, for distilling nitrate of soda and sulphuric acid and generating nitric-acid vapor to supply the pipe $w'$, as aforesaid.

A detailed view of the furnace is shown in Fig. 5.

The retort $t'$ is filled about half-full with nitrate of soda. About an equal weight of sulphuric acid is added to it for one charge. A fire is put into the furnace, and the retort is heated moderately at first and more highly at the latter part of the distillation. The residuum in the retort will be sulphate of soda.

In Fig. 7, $c^2$ is a round foundation, built of brick, seven feet high and six feet in diameter. On it stands the vessel $d^2$, constructed of wooden staves two inches thick and hooped with strong iron hoops. It is six feet in diameter and six feet high, and has strong heads in both ends. $e^2$, $f^2$, and $g^2$ are strong wooden boxes, placed one above the other within this vessel. $h^2$ is a pipe, about one inch and a half in diameter, passing through the upper head and extending a little distance below its under surface. $i^2$ is its stop-cock. $j^2$ is a funnel fastened to its upper end. $k^2$ is a pipe about an inch and a half in internal diameter and provided with a stop-cock, $l^2$. The letter $m^2$ is a support for the pipe $k^2$. A cross-section of this vessel shows more clearly the arrangement of the boxes inside of this vessel and the various pipes connected with them. It will be seen that these boxes are placed one above the other, somewhat like a pair of stairs. The object in view is to completely saturate water with chlorine gas or with muriatic-acid gas, as the case may be, which I generate in the three retorts set in the bench $k$. The upper box is provided with a pipe, $n^2$, two inches in diameter, passing through its bottom, and having its upper end lower than the top of the box, the object being to allow the water in the box to overflow through this pipe into the box $f^2$ underneath it. The box $f^2$ is provided with a similar pipe, $o^2$, to allow the same water to pass into $g^2$ below it, where it overflows the vessel $g^2$ into the reservoir $d^2$.

The letter $p^2$ is a pipe communicating with the back end of the top retort in the bench $k$, and passing through the top of the reservoir $d^2$, and terminating a little above the bottom of the box $e^2$. The cold water let in through the pipe $k^2$ into the funnel $j^2$ passes through the pipe $h^2$, and fills the box $e^2$ up to a level with the top of the pipe $n^2$, when it overflows through that pipe into the box underneath. At the same time the chlorine gas or the muriatic-acid gas, as the case may be, which flows from the top retort through the pipe $p^2$, escapes from the end which is submerged beneath the water in the box $e^2$, and is absorbed by it. The water thus partially charged with the gas passes down into the box $f^2$, where it receives another fresh quantity of gas through the pipe $q^2$, leading from the retort $m$. This same water, now more perfectly saturated, passes down through the pipe $o^2$ into the box $g^2$, where it is again charged with a fresh supply of gas flowing through the pipe $r^2$, leading from the retort $n$. The water thus completely saturated and overflowing into the vessel $d^2$ escapes through the pipe $s^2$ into the storage-tank $t^2$. This tank is made of solid planks, inclosed in a hard-wood frame and wedged together tightly, so as to effectually prevent leakage. It is provided with a tight top. The pipe $s^2$ dips down to near the bottom of this tank. The pipe $u^2$, provided with a stop-cock, passes through the top simply, and is designed to allow the air to escape from the tank when it is being filled with water. The pipe $v^2$, provided with a stop-cock, passes through the top of the tank and down to near its bottom, its object being to allow a pump to be attached to its top by a suitable connection to deliver the water in the tank $t^2$ back again into the funnel $j^2$, to pass through the boxes $e^2$, $f^2$, and $g^2$ again, and be more completely saturated with the gas or gases aforesaid.

The pipe $w^2$ is designed to indicate when the tank $t^2$ is full. The pipe $x^2$ is designed to draw off the saturated water in $t^2$.

This device is believed by me to be new and useful for saturating water completely with the gases aforesaid. The gases thus manufactured and the water thus saturated with them are employed by me in the extraction of the precious metals from certain non-smelting ores in a very economical and remarkable manner, to be more fully set forth in another application for Letters Patent.

Having thus described in detail the mechanism of my improved furnace and apparatus for smelting metallic ores and saving their products, I will now explain the operation of my invention:

All metallic ores, of every name and sort, which are capable of being melted to a fluid slag either by themselves or by mixing one or more with others, or by the aid of suitable fluxes, can be smelted in my furnace. In general, all ores to be smelted must first be broken up into sizes similar to those of hickory-nuts or hens' eggs. The preparations, mixtures, and fluxes of these smelting ores require much skill. As, however, I intend to make another application for Letters Patent covering this branch of the metallurgical art, I shall not enter into a particular description of the same in this specification.

To put my furnace into operation, I first dump on the platform M a suitable quantity of prepared ore for charging the furnace. I then open the door O and push through it a sufficient quantity of ore to fill the furnace full, as shown in Fig. 3, and close the door. I then put fuel into the fire-places C and I and ignite it. I fill the two pans X and Y in the ash-pits with water and close the doors tightly. I then start the engine and put the blower Z in rapid motion. Being connected to the pipe $g$, air is forced through this pipe up to the T $h$, from whence it divides and flows each way through the bends of the heating-pipe, as shown in Fig. 9. By opening the stop-cock S in R a powerful blast of air is delivered into the fire-place I over the fuel, which intensifies the combustion and forces its hot products over the bridge-wall and into the ore to be melted. I also open the stop-cocks $b$ $d$ $f$ in the other end of the blast-pipe R, and deliver blasts of air into the fire-place C above the fuel, and into its ash-pit E, and into the ash-pit K. The pressure of air in these ash-pits causes it to ascend through the grate-bars and through the burning fuel and create additional heat, and incandescent gases to be driven with a blow-pipe intensity from the mouth of the upper furnace into the melting ore, and from the lower fire-place, under the floor V, through the flue F, to the uptake G. The blast into the fire-place and ash-pit C and E need not be very strong. The consequences now are, that the floor V and the cast-iron pot U very soon become heated nearly or quite red-hot. No danger can now occur that the melted metal or slag filling the pot U will chill. The ore under the operation of the intense heat begins to melt into a very fluid slag. The metal in it, being also melted and having a specific gravity greater than the slag, will settle from it and collect in the bottom of the pot U. It is of the utmost importance that the heat shall be sufficiently intense to fuse the ore into a very thin and limpid slag; otherwise the metal cannot subside from it, but will run off in the slag.

One of the great merits of my improved furnace and powerful hot-blast is, that I fuse the ore so perfectly that every particle of metal separates from the liquid slag. The hot gases now rise up through the interstitial spaces of the charge and raise it to a red heat. This effects a perfect roasting of the ore by the time each successive layer settles down to the melting-point opposite the mouth of the fire-place I.

As the heat increases the inside wall of the furnace T becomes red-hot, and the sand packing between this wall and the outside wall, L, rises to a very elevated temperature, and communicates a high degree of heat to the entire length of the blast-pipe R, and consequently to the air passing through it. By this arrangement this iron pipe is protected from the direct action of the fire and corroding gas. It takes up a large portion of the waste heat, which would otherwise escape through the outer wall, L, and delivers it back again into the furnace-fires, thereby saving much fuel and adding to the force of the blast. This packing also makes the wall L gas-tight.

The sulphur in the sulphides composing many of the ores is volatilized by the heat, and takes fire if sufficient oxygen be present, and produces sulphurous-acid gas. The water in the pans in the two ash-pits boils by the deflected heat, and the steam rises up through the grate-bars, cooling them in its passage, and enters the fuel above them, where it is decomposed into oxygen and hydrogen gases, which add fuel to the fires and white-hot gases to the smelting-furnace. Along with the ascending gases aforesaid, metallic fumes of the more volatile metals are borne, in greater or less abundance, and all the mingled products of combustion pass up and through the arched flue N, and down under the retorts $l\ m\ n$ in the bench $k$, and up between and around the said retorts, and escape through the flue $a'$ in the direction of the arrows to the uptake $q'$. In the passage of the incondensable gases from the furnace to the chimney aforesaid all condensable matters are eliminated from them. Such as fall by cooling and by greater specific gravity from the flue N and from the interior of the bench $k$ collect in the funnel-shaped boxes $m'\ m'$. The rest pass into the flue $a'$, and are condensed successively as they are cooled in the different parts of this flue, which is submerged in the water-tank $z$.

All the metallic products which are thus condensed and which fall by cooling and by specific gravity are collected in the funnel-shaped boxes $h'\ h'\ h'\ h'\ h'\ h'$. The character and quantity of these condensed products will depend on the character of the ore charged into the blast-furnace; but as the furnace and every part of the apparatus are gas-tight, no leakage or loss of any metallic vapors or fumes can occur, and whatever sort or quantity comes from the furnace will be found condensed in some one of these boxes.

A considerable separation of the different metals and powders will be thus secured, in consequence of the different melting-points and different specific gravities of these substances. The accumulations in these several boxes aforesaid may be removed from time to time by taking hold of the ends $j'$ of the sliding doors $i'$ of the boxes under the water-tank and of the ends $n'\ n'$ of the sliding doors under the retorts, and drawing them out and allowing the condensed products to fall into the trays $k'\ k'\ k'\ k'\ k'\ k'$ and into the trays $l'\ l'$, and then pushing the doors respectively back into their places and opening the doors $t$ and drawing out the trays $k'$ and $l'$, and emptying them and returning them to their places and closing the said doors and luting their joints with clay. These condensed products are to be treated and utilized according to their character. The cooled and permanent gases pass from the flue $a'$ through the pipe $o'$ into the sulphuric-acid chamber $p'$. A considerable portion of these gases is sulphurous acid. I convert this into sulphuric acid in this chamber in the manner hereinbefore described. To delay the rapid passage of the mixed sulphurous acid, aqueous vapor, nitric-acid vapor, and atmospheric air, and give them more time for mutual reaction in this chamber, I arrange in it the partitions 1 2 3 4 5 6 7 8, as shown in Fig. 3, and cause the mixed gases to follow the course of the arrows therein seen. The unutilized gases escape through the uptake $q'$.

The letter $r'$ is a steam-pipe provided with a stop-cock, by opening which a jet of steam shoots up into $q'$ and produces a draft, which may be regulated according to circumstances.

The strength of the sulphuric acid made by this process in the chamber $p'$ will be about 1.65 gravity. This is strong enough for my purposes without further concentration in platinum stills. To utilize this acid for the manufacture of chlorine gas, for dissolving gold, and muriatic-acid gas, I charge each of the retorts $l\ m\ n$ with two hundred and fifty pounds of chloride of sodium and three hundred and thirty pounds of sulphuric acid from the chamber and three hundred pounds of the deutoxide of manganese. I first mix well together the chloride of sodium and manganese in these proportions before charging. After charging the retorts with this mixture in the proportions aforesaid, and shutting up the doors gas-tight, I introduce the sulphuric acid through the funnels $q\ q\ q$. The retorts are sufficiently heated by the gases from the smelting-furnace, as aforesaid. A double decomposition takes place between the substances in the retort. Water is decomposed into oxygen and hydrogen gases. The oxygen unites with the sodium of the salt and converts it into an oxide. The sulphuric acid dissolves it and converts it into the sulphate of soda. The hydrogen of the water combines with the oxygen of the manganese and reproduces water. Chlorine gas is set free, and passes through the pipes $p^2$, $q^2$, and $r^2$ into the boxes $e^2$, $f^2$, and $g^2$ of the vessel $d^2$. At the same time water is let into these boxes through the pipe $h^2$ from the funnel $j^2$ and from the supply-pipe $k^2$. The water thus saturated with chlorine gas and overflowing from the box $g^2$ into vessel $d^2$ passes through the pipe $s^2$ into the storage-tank $t^2$. This chlorine water I employ to convert gold, in certain ores, into a chloride.

To utilize my sulphuric acid and my retorts, heated as aforesaid, to produce muriatic acid, I charge them precisely in the manner for manufacturing chlorine gas, with the exception of the deutoxide of manganese. This substance is not necessary in this operation. Muriatic-acid gas is thus generated in the retorts. The water is decomposed into oxygen and hydrogen. The oxygen unites with the sodium of the salt and converts it into an oxide. The sulphuric acid dissolves it and converts it into the sulphate of soda. The hydrogen of the water, in a nascent state, unites with the chlorine and produces muriatic-acid gas, which is a compound of one volume of chlorine and one of hydrogen united without condensation. The muriatic-acid gas thus generated in the retorts passes out of them through the pipes aforesaid and into the boxes charged with water, as aforesaid. The water absorbs, at a temperature of 69°, four hundred and sixty-four times its volume, increases one-third in bulk and about three-fourths in weight. This acid flows through the pipe $s^2$ into the storage-tank $t^2$ for further use. Sulphate of soda is left in the retorts as a secondary product. As the charge of ore in the blast-furnace melts at its lower extremity, opposite to the mouth of the fire-place I, the metal collects at the bottom of the pot U, and the slag, being lighter in gravity, rests on it, while the ore above gradually settles down. As this takes place fresh ore is pushed into the top of the furnace from the platform M through the door O, so as to keep the furnace full of ore up to its top. The door O is kept closed. The fluid slag below the unmelted ore and above the melted metal is drawn off through the pipe Q. The melted metal collected in the bottom of the pot U is withdrawn through the pipe P.

It will be seen in the detailed view of Fig. 4 that A' shows a large opening into the side of the furnace-wall opposite these tap-holes and above the floor V, for the purpose of opening and closing these tap-holes in closer proximity to the pot U. They are closed by a ball of stiff clay pushed into their mouths by an iron rod, one end of which has a diameter nearly as great as the diameter of the holes. They are opened by the other end of this rod, which is sharpened to a point, so as to pierce through these clay stoppers.

The fluid slag is always to be drawn off first through the pipe Q. As it flows out the charge in the furnace settles down. When it ceases to flow this tap-hole is closed up, as aforesaid. Then the lower pipe, P, is opened, and the metal flows through it from the bottom of the pot U. When this ceases to run metal the hole is closed. The slag is conducted away by a descending gutter. The times of opening and closing these tap-holes will depend upon the quantity of ore melted in a given time and the quantity of metal contained in the ore. Experience alone can determine them.

If it should be desired to have the slag and metal flow continuously from these respective tap-holes, the pipes P and Q may be inclined upward to a suitable height, so that the fluid slag and metal, respectively, will have to ascend through these pipes in order to flow over their extremities.

It is understood that the metal flowing from the bottom of the pot U through the pipe P will be pure bullion, composed of the mixed metals which may be contained in the ore. This may be sold in the market as such, or separated and refined in suitable works on the ground.

My improved blast-furnace and condenser work gas-tight, condense and save all the metallic vapors which are now lost, and which endanger the lives and health of the workmen.

I do not claim, broadly, the placing of a coil of pipe within the walls of a furnace to heat air or steam, but the construction and location of my vertical and convoluted superheater R, $h$, and $g$, extending from the lower part of the boshes to the top of the cone of a blast-furnace, for absorbing and utilizing the waste heat of the walls of the same by returning it again, in the form of heated air, to the combustion and puddling chamber, for dividing the air-blast in the middle of the superheater by means of the T $h$, and reducing the friction between the air and pipe one-half, and consequently the power required to force the air through it differs from said coils, and has many other advantages and economies, being arranged in a packing of sand, pulverized slag, or other suitable material between the two concentric walls of a blast-furnace, whereby the iron pipe composing the superheater is protected from the melting heat of the interior of the furnace, and from the corroding and consuming action of sulphur and its destructive compounds generated so abundantly from the ore.

Having described the mechanism and operation of my improved furnace and apparatus for smelting metallic ores and saving their products, what I claim as new and useful, and desire to secure by Letters Patent, is embraced in the following claims:

1. In combination with a suitable blower, the superheater R, arranged in the packing between the two concentric walls of the furnace, whereby the pipes constituting the superheater are heated by the furnace and are protected from the action of the sulphurous-acid gas passing through the furnace-walls, said superheater consisting of two series of vertical pipes extending the whole length of the furnace, the said series being united at the top by a T, into which the pipe $g$ is inserted to conduct air from the blower, whereby the blast is divided, thereby lessening the friction of the air in the pipes, substantially in the manner and for the purposes shown and described.

2. In combination with a blast-furnace, one or more fire-places, I, provided with grates for burning coal and with blast-pipes for conducting the hot-blast thereto, said fire-places opening into the furnace at or near the top of the crucible, whereby the hot gases of combustion, together with unconsumed hydrocarbon gases and fine coal-dust, are injected into the furnace to deoxidize and smelt the metals and ores therein, substantially in the manner and for the purposes herein set forth.

3. In combination with the floor V and cast-iron crucible U of a blast-furnace, the fire-place C, having a flue, F, and uptake G, for constantly heating the said crucible and preventing the fused metal and slag from chilling in the same, substantially in the manner and for the objects herein set forth.

4. In a blast-furnace, the crucible thereof, consisting of iron lined with refractory material, whereby heat is conducted to the interior of said crucible and leakage of metal is prevented, substantially in the manner and for the purposes herein shown and described.

5. The combination of the retorts $l\,m\,n$, provided with the feed-pipes $o$, stop-cocks $p$, and funnels $q$, and with the discharge-pipes $p^2$, $q^2$, and $r^2$, and set in the bench $k$, with the condenser $d'$ and $e'$, submerged in the water-tank $z$, and through which the condensing-flue $a'$ runs, substantially as shown and described.

6. In combination with the water-tank $z$, the cooling and condensing flue $a'$, being a continuation of the covered flue N, leading from the top of the blast-furnace, having its upper side, $d'$, wholly above the bottom of the tank and submerged in it, and its under side, $e'$, partially above the bottom and submerged in water, and partially below the bottom out of contact with water, and forming two funnel-shaped sides, which inclose two openings through the bottom of the tank, all substantially in the manner and for the purposes set forth.

7. In combination with the funnel-shaped boxes $m'\,h'$ within the wall $s$, the sliding doors $n'\,j'$, closing said boxes and passing gas-tight through the said wall, substantially in the manner and for the purposes set forth.

8. The trays $l'\,k'$, for receiving the condensed metallic fumes and other matters, in combination with the boxes $m'$ and $h'$, substantially in the manner and for the purposes shown and described.

9. In combination with the sulphuric-acid chamber $p'$, the pipe $v'$, with the pipe $w'$, and the retort $t'$ in the niter-furnace $b^2$, substantially in the manner and for the purposes hereinbefore set forth.

10. In combination with $o'$, leading into the sulphuric-acid chamber $p'$, the air-pipe $v'$, having an inlet-pipe, $z'$, the steam-pipe $w'$, ending in $x'$, and the nitric-acid-fume pipe $u'$ within the latter, whereby a mixture of air, steam, and nitric-acid vapor is injected, in conjunction, into the sulphuric-acid chamber $p'$, substantially in the manner and for the objects indicated and explained.

HENRY W. ADAMS.

Witnesses:
JOHN H. BURROUGHS,
CHARLES BORLAND.